United States Patent
Mandeville et al.

(10) Patent No.: US 12,292,099 B2
(45) Date of Patent: May 6, 2025

(54) DYNAMICALLY PIVOTABLE FRICTION DRIVE

(71) Applicant: Husqvarna AB, Huskvarna (SE)

(72) Inventors: Kenneth Mandeville, Midland, NC (US); Ryan Page, Charlotte, NC (US); James McClay, Charlotte, NC (US); Ryan Copping, Charlotte, NC (US)

(73) Assignee: HUSQVARNA AB, Huskvarna (SE)

(*) Notice: Subject to any disclaimer, the term of this patent is extended or adjusted under 35 U.S.C. 154(b) by 0 days.

(21) Appl. No.: 18/726,652

(22) PCT Filed: Jan. 5, 2022

(86) PCT No.: PCT/US2022/011265
§ 371 (c)(1),
(2) Date: Jul. 3, 2024

(87) PCT Pub. No.: WO2023/132822
PCT Pub. Date: Jul. 13, 2023

(65) Prior Publication Data
US 2024/0418247 A1    Dec. 19, 2024

(51) Int. Cl.
*F16H 15/10* (2006.01)
*F16H 63/30* (2006.01)

(52) U.S. Cl.
CPC ......... *F16H 15/10* (2013.01); *F16H 63/3013* (2013.01); *F16H 63/302* (2013.01)

(58) Field of Classification Search
CPC ....................................................... F16H 15/10
USPC ................................................ 476/24, 57, 58
See application file for complete search history.

(56) References Cited

U.S. PATENT DOCUMENTS

| | | | |
|---|---|---|---|
| 818,747 A | | 4/1906 | Cowles |
| 1,963,880 A | * | 6/1934 | Barthelemy ........ F16H 61/6647 235/61 C |
| 2,942,487 A | * | 6/1960 | Claus ..................... F16H 15/10 476/24 |

(Continued)

FOREIGN PATENT DOCUMENTS

| | | |
|---|---|---|
| JP | S62196461 A | 8/1987 |
| JP | H0381453 U | 8/1991 |
| JP | 2001059558 A | 3/2001 |

OTHER PUBLICATIONS

International Search Report and Written Opinion of corresponding International Application No. PCT/US2022/011265, mailed on Jul. 15, 2022, all enclosed pages cited herein.

*Primary Examiner* — William C Joyce
(74) *Attorney, Agent, or Firm* — BURR & FORMAN LLP

(57) ABSTRACT

A friction drive transmission includes a drive pulley having an engaging face, a tip plate that supports the drive pulley and is configured to pivot about a pivot axis that is parallel to an axis of rotation of the engaging face of the drive pulley, and a friction ring that drives an axle. The friction ring may contact the engaging face of the drive pulley and may be moveable relative to the engaging face of the drive pulley to transition between forward rotation and reverse rotation. When the friction ring moves into a reverse rotation position for reverse rotation of the axle, the tip plate may pivot, with the drive pulley, about the pivot axis from a first position into a second position. The first position may be different from the second position.

19 Claims, 9 Drawing Sheets

(56) References Cited

U.S. PATENT DOCUMENTS

| | | | |
|---|---|---|---|
| 3,631,730 A * | 1/1972 | Hadler | F16H 3/00 476/24 |
| 4,169,392 A | 10/1979 | McDonald | |
| 4,173,153 A | 11/1979 | Klug et al. | |
| 4,502,344 A | 3/1985 | Klug | |
| 5,353,578 A | 10/1994 | Irby et al. | |

* cited by examiner

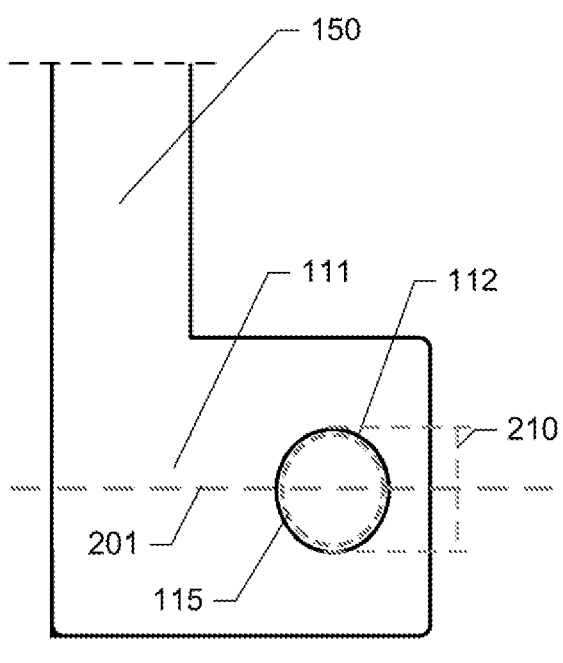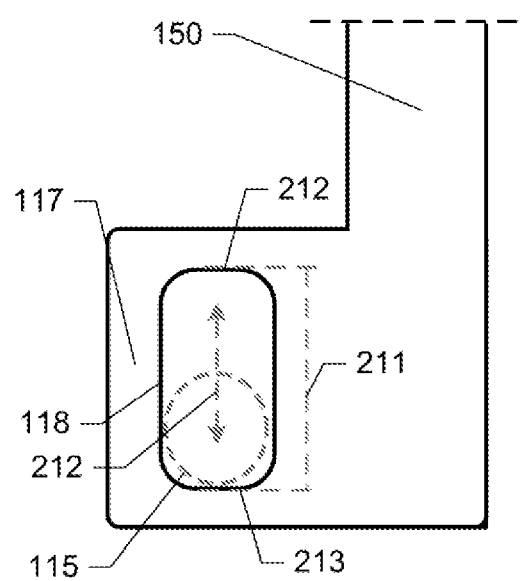
FIG. 3A
FIG. 3B

DYNAMICALLY PIVOTABLE FRICTION DRIVE

TECHNICAL FIELD

Example embodiments generally relate to friction drive transmission systems and, more particularly, relate to dynamically positioning rotating components of a friction drive to improve operation.

BACKGROUND

Friction drive transmissions are commonly used in a variety of motorized vehicles, tools, and the like. Such transmissions can be desirable because their relative simplicity in design and the minimal components to implement. One particularly desirable feature of a friction drive transmission is that a driven axle can transition between forward and rearward rotational directions, and be rotated at different speeds, merely by moving a friction ring into different engaging positions on an engaging face of a drive pulley.

In some friction drive transmissions, a wider friction ring can be used to increase the engaging surface area between the friction ring and the engaging face of the drive pulley resulting in improved transfer of rotational energy from the engaging face of the drive pulley to the friction ring. However, because an external side of the friction ring rotates at a slightly different speed than the internal side of the friction ring—with such speed difference increasing as the width of the friction ring increases—smooth and consistent rotating engagement between the engaging face of the drive pulley and the friction ring may not occur. In particular, in some friction drive transmissions, when the friction ring moves into certain positions in engagement with an engaging face of a drive pulley, these speed differences on the friction ring may cause the engagement between the friction ring and the engaging face to skip and wobble. This skipping and wobbling can cause vibrations and loud audible noises, which can result more rapid wear or even damage to operating components. Additionally, these issues can lead to operators believing that the transmission may need costly servicing, when it does not. As such, improvements in the technology of friction drive transmissions are desired to limit or inhibit such skipping or wobbling of the friction ring and to otherwise increase performance of the friction drive transmission.

BRIEF SUMMARY OF SOME EXAMPLES

According to some example embodiments, a friction drive transmission is provided. The friction drive transmission may comprise a drive pulley comprising an engaging face, a tip plate that supports the drive pulley and is configured to pivot about a pivot axis that is parallel to an axis of rotation of the engaging face of the drive pulley, and a friction ring that drives an axle. The friction ring may contact the engaging face of the drive pulley and may be moveable relative to the engaging face of the drive pulley to transition between forward rotation and reverse rotation. When the friction ring moves into a reverse rotation position for reverse rotation of the axle, the tip plate may pivot, with the drive pulley, about the pivot axis from a first position into a second position, the first position being different from the second position.

According to some example embodiments, another friction drive transmission is provided. The friction drive transmission may comprise a drive pulley comprising an engaging face, a tip plate that supports the drive pulley and is configured to pivot about a pivot axis that is parallel to an axis of rotation of the engaging face of the drive pulley, and a friction ring that drives an axle. The friction ring may contact the engaging face of the drive pulley and may be moveable relative to the engaging face of the drive pulley to transition between forward rotation and reverse rotation. In response to an engaging force between the friction ring and the engaging face, the tip plate may be configured to pivot about the pivot axis to align a centerline of the engaging face with a centerline of the friction ring when the friction ring is in a reverse rotation position, and move the centerline of the engaging face below the centerline of the friction ring when the friction ring is in the forward rotation position.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIGS. 3A and 3B illustrates zoomed views of tip plate tabs of the tip plate of FIGS. 1, 2, 4A, and 4B according to some example embodiments;

DETAILED DESCRIPTION

Figure 1:
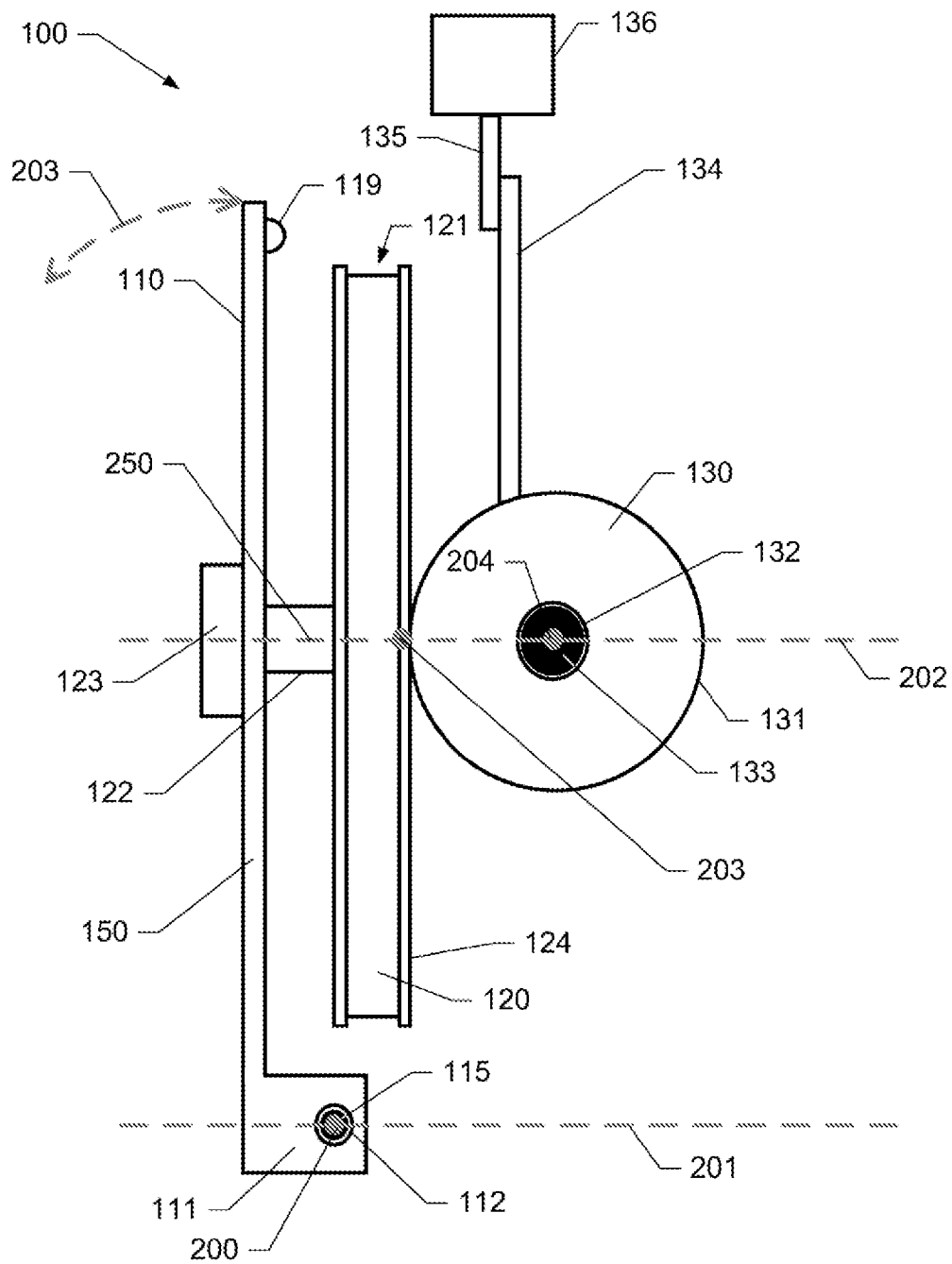
FIG. 1 illustrates side view of a friction drive transmission according to some example embodiments.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

According to some example embodiments, a friction drive transmission may include a drive pulley that is supported by a tip plate that swivels relative to a first axis, and also pivots relative to a second axis that is orthogonal to the first axis, to improve positional engagement between a friction ring and an engaging face of the drive pulley. Via the pivoting movement of the tip plate about the second axis, a centerline of an engaging face of a drive pulley can be moved into desired positions relative to a centerline of a friction ring to improve performance of the friction drive transmission when operating in both the forward and reverse directions. Via this pivoting movement of the tip plate, the technical problem with skipping and wobbling can be limited or eliminated. To do so, the tip plate may pivot to bring a centerline of the engaging face of the drive pulley into alignment with a centerline of the friction ring for reverse operation. Additionally, via this pivoting movement of the tip plate, self-acceleration and more accurate and consistent speeds may be realized when the friction ring is positioned for forward operation. To do so, the tip plate may pivot to bring a centerline of the engaging face of the drive pulley below (e.g., slightly below, such as less than 50 millimeters below for a ten centimeter diameter engaging face) the centerline of the friction ring for forward operation.

With respect to an example structure of a friction drive transmission, according to some example embodiments, the tip plate may be supported by and in physical connection with a mounting bar that passes through openings in the tip plate. In this regard, the tip plate may include a securing aperture on one side of the tip plate and a securing slot on a second side of the tip plate. The securing slot may have an elongated shape such that this elongated dimension facilitates pivoting about an axis at the securing aperture, due to the elongated dimension being larger for the securing slot than for the securing aperture. In other words, the tip plate may be permitted to pivot about an engagement point between the securing aperture and the mounting bar because the elongated shape of the securing slot allows for more movement of the mounting bar within the securing slot, relative to the securing aperture. The pivoting movement of the tip plate may be caused by the engagement of the friction ring on the engaging face of the drive pulley acting to urge the tip plate into a desired pivoted position, bounded by the range of movement permitted by the securing slot. As such, positioning of the friction ring in a forward rotation position relative to the engaging face may cause the tip plate to pivot in a first direction, and positioning of the friction ring in a reverse rotation position relative to the engaging face may cause the tip plate to pivot in a second, opposite, direction. The elongated dimension of the securing slot may be selected to place the engaging face of the drive pulley in a desired position relative to the friction ring for optimized engagement in both the forward and reverse directions.

Figure 2:
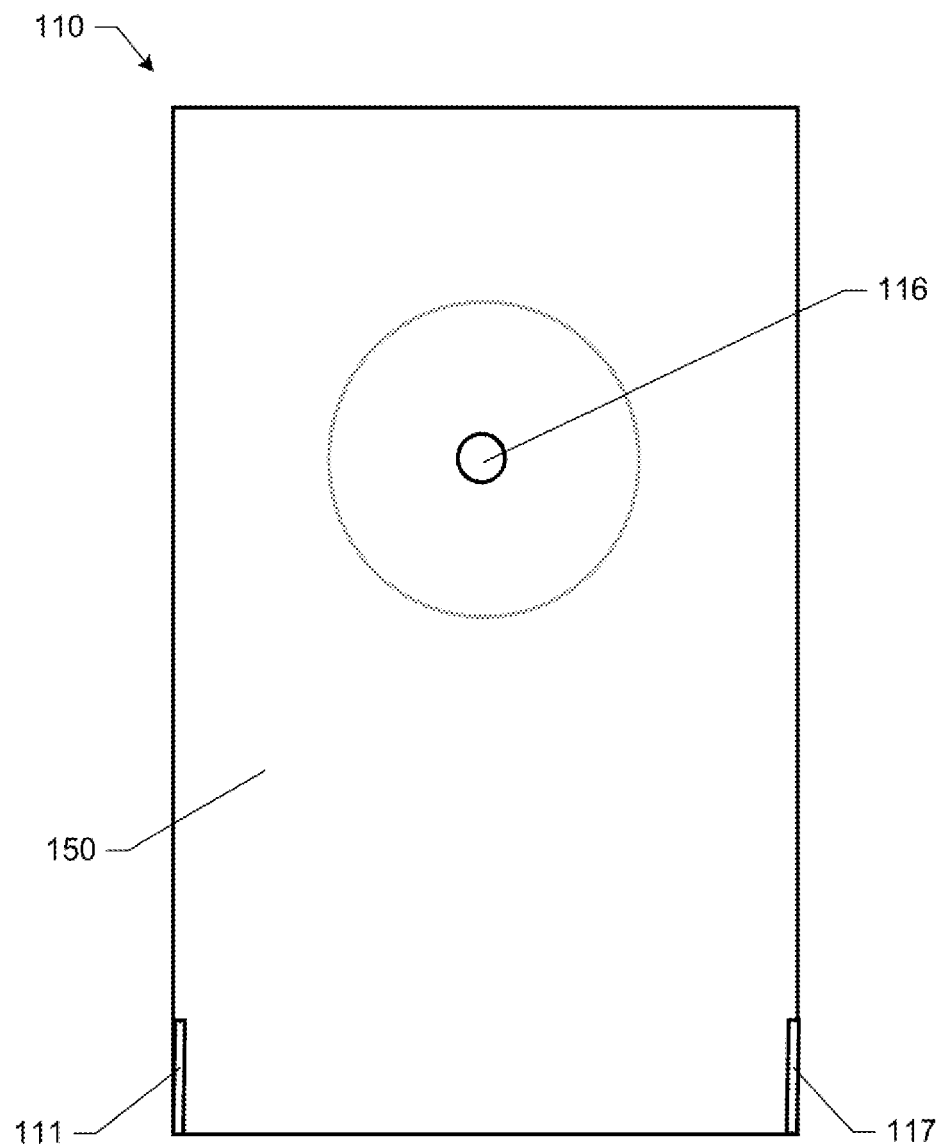
FIG. 2 illustrates a front view of a tip plate according to some example embodiments.

To describe the structure and operation of an example friction drive transmission, according to some example embodiments, reference is now made to FIG. 1, which illustrates a side view of a friction drive transmission 100. The friction drive transmission 100 may comprise a tip plate 110, a drive pulley 120, and a friction ring 130. FIG. 2 illustrates a front face of the example tip plate 110 in isolation from the other components of the friction drive transmission 100. FIGS. 3A and 3B illustrate zoomed side views of tabs 111 and 117 that extend away from a body of the tip plate 110 and include openings that facilitate a swiveling movement of the tip plate towards or away from the friction ring 130, and also pivoting movement of the tip plate 110 within a plane of the tip plate 110 and about an axis that is parallel to an axis of rotation 250 of the engaging face 124 of the drive pulley 120 (and of the drive pulley 120 itself).

In general, the friction drive transmission 100 may operate to convert the rotation of the drive pulley 120 about a pulley axis 250 into the rotation of the friction ring 130 about an axle axis 204 that is substantially orthogonal to the pulley axis 250, to drive an axle 133 coupled to the friction ring 130. To do so, the friction ring 130 may have an engaging ring surface 131 (e.g., which may have a relatively high coefficient of friction) that may contact a rotating engaging face 124 of the drive pulley 120 under a pressing force between the engaging face 124 and the engaging ring surface 124 of the friction ring 130, to cause rotation of the friction ring 130 and the axle 133. The axle 133 may drive, for example, a work tool or wheels of a tractor, mower, or the like.

The drive pulley 120, according to some example embodiments, may be coupled to a drive belt to rotate the drive pulley 120. As such, according to some example embodiments, the drive pulley 120 may include, or be rotationally coupled to, a belt groove 121. The belt groove 121 may be configured to receive a drive belt (not shown) that is driven by an engine or motor (also not shown). As such, the drive belt may cause the drive pulley 120 to rotate in a given rotational direction. According to some example embodiments, the engine or motor that drives the drive belt, and therefore the drive pulley 120, may operate at a constant rotational speed and may only rotate in a single direction. However, via operation of the friction drive transmission 100 and the positioning of the friction ring 130 at different locations on the engaging face 124 of the drive pulley 120, the axle 133 may be driven in forward or reverse rotational directions, and at different speeds.

The drive pulley 120 may be supported by a tip plate 110 and, more specifically, a plate portion 150 of the tip plate 110. The tip plate 110 may be supported by a mounting member. The mounting member may be embodied in a number of different ways. For example, the mounting member may take the form of a mounting bar 115. According to some example embodiments, the mounting member may take the form of posts that extend in an internal direction from walls of a housing of the friction drive transmission 100 to engage with the tip plate 110. The mounting member may operate to support the tip plate 110 and also allow the tip plate 110 to swivel about a swivel axis 200 defined by the engagement of the mounting member with the tip plate 110.

In this regard, the tip plate 110 may include tabs 111 and 117 (FIGS. 2, 3A, and 3B) that extend away from a plane of the body of the tip plate 110. The tabs 111 and 117 may include openings that may be configured to receive the mounting member. For example, the openings may include a securing aperture 112 on the tab 111 and a securing slot 118 on the tab 117. The engagement of the mounting member (e.g., the mounting bar 115) with the securing aperture 112 and the securing slot 118 may allow the tip plate 110 to swivel about a swivel axis 200 relative to the engaging member in the directions shown by the arrow 203. In this regard, for example, the mounting bar 115 may be held in a fixed position due to being physically connected to a housing of the friction drive transmission 100, and movement of the tip plate 110 relative to the mounting bar 115 may be restrained to swiveling movement about a swiveling axis 200, as indicated by arrow 203, and pivoting movement about the pivot axis 201 as further described below.

As mentioned above, the drive pulley 120 may be supported by the tip plate 110, for example, via a pulley shaft 122 and a pulley fastener 123, that are configured to permit the drive pulley 120 to rotate relative to the tip plate 110 due to being driven by the drive belt. The pulley shaft 122 may pass through a pulley shaft aperture 116 in the tip plate 110 and be secured to the tip plate 110 via the pulley fastener 123. Because the drive belt may be flexible, the drive pulley 120 and the tip plate 110 may be permitted to swivel about the swivel axis 200 through a small range of angles, while still maintaining driving engagement with the drive belt. In this regard, according to some example embodiments, a cable or actuator may be coupled to the tip plate 110 at, for example, the connector 119 to push or pull the tip plate 110, in response to action taken by an operator (e.g., pulling of a lever, depressing a foot pedal, or the like), to cause the swiveling movement of the tip plate 110.

The swiveling movement of the tip plate 110 may move the drive pulley 120 into and out of engagement with the friction ring 130. Further, the swiveling movement of the tip plate 110 may move the engaging face 124 relative to the friction ring 130 to increase or decrease an engaging force between engaging face 124 and the friction ring 130. When the tip plate 110 is swiveled away from the friction ring 130, rotation of the axle 133 may cease since the engaging face 124 of the drive pulley 120 may no longer be in contact with the friction ring 130 to drive rotation of the friction ring 130. Alternatively, when the tip plate 110 is swiveled toward the friction ring 130 and into engagement with the friction ring 130, the rotation of the engaging face 124 of the drive pulley 120 causes rotation of the friction ring 130 (assuming the friction ring 130 is not positioned at the axis of rotation 250 of the engaging face 124 of the drive pulley 120).

As mentioned above, the friction ring 130 may have a circular outer engaging ring surface 131. According to some example embodiments, the engaging ring surface 131 may formed of a high-friction material, such as rubber, to increase the frictional engagement with the engaging face 124 of the drive pulley 120. The engaging ring surface 131 may be formed, according to some example embodiments, by a replaceable ring that may be replaced during standard maintenance due to wear.

The friction ring 130 may also have a central friction ring aperture 132, within which the axle 133 may be disposed. The engagement between the axle 133 and the friction ring 130 may permit the friction ring 130 to move or slide along the axle 133 and the axle axis 204, but the friction ring 130 and the axle 133 may rotate about the axle axis 204 together (e.g., due to the axle 133 and the friction ring aperture 132 being keyed).

To move the friction ring 130 in a sliding fashion along the axle's axis of rotation 204, one or more control arms 134 and 135 that are physically connected to the friction ring 130 via a coupler 137 (FIGS. 4A and 4B) may be employed. An actuator 136 may be configured to urge the friction ring 130, via its engagement with the control arms 134 and 135, into various sliding positions relative to the axis of rotation 250 of the engaging face 124 of the drive pulley 120. The actuator 136 may be controlled in a number of ways. For example, the actuator 136 may be powered and may therefore be controlled by an electromechanical actuator or the actuator 136 may be manually controlled via a lever or cable moved by an operator. Through movement of the friction ring 130, relative to the engaging face 124 of the drive pulley 120, the axle 133 may be rotated at different speeds and in different rotational directions.

The engaging face 124 of the drive pulley 120 may also define an engaging face centerline 203. The engaging face centerline 203 may be defined across the engaging face 124, through the axis of rotation 250 of the engaging face 124, and parallel to the swivel axis 200. Note that due to the pivoting movement of the tip plate 110, as further described below, the swivel axis 200, and accordingly the engaging face centerline 203, pivots about the pivot axis 201, with the tip plate 110. Additionally, a centerline for the friction ring 130 may also be defined as the friction ring centerline 202. The friction ring centerline 202 may be defined as a line that passes through the axle axis 204 and the point of contact between the friction ring 130 and the engaging face 124. According to some example embodiments, a relationship involving the alignment or non-alignment of the engaging face centerline 203 and the friction ring centerline 202 can lead to improved operation of the friction drive transmission 100 as further described below.

Referring now to FIGS. 3A and 3B, some of the structures associated with the swiveling and pivoting movement of the tip plate 110 are shown. In particular, zoomed side views of the tab 111 with securing aperture 112 and the tab 117 with securing slot 118 are shown. With respect to the structure of the tab 111, the tab 111 extends away from a body portion (e.g., plate portion) of the tip plate 110 to create a member for engagement with a mounting member. In this instance, the mounting bar 115 is shown in dashed lines within the securing aperture 112. According to some example embodiments, the clearance between the exterior of the mounting bar 115 and the interior of the securing aperture 112 may be relatively small so that movement of the mounting bar 115, relative to the tip plate 110, may be substantially constrained in directions parallel to a plane of the securing aperture 112. According to some example embodiments, the securing aperture 112 may be circular and the mounting bar 115 may have a circular cross-section. Further, the securing aperture 112 may define a dimension 210 (e.g., a height) that is perpendicular to axis of rotation 250 of the drive pulley 120 and perpendicular to the swivel axis 200.

With respect to the structure of the tab 117, the tab 117 extends away from a body portion (e.g., plate portion) of the tip plate 110 to create another member for engagement with a mounting member. In this instance, the mounting bar 115 is again shown in dashed lines within the securing slot 118. According to some example embodiments, the clearance between the exterior of the mounting bar 115 and the interior of the securing slot 118 on the sides of the securing slot 118 may be relatively small so that movement of the mounting bar 115, relative to the tip plate 110, may be substantially restricted in directions parallel to the axis of rotation 250 of the drive pulley 120. However, the securing slot 118 may be elongated in a dimension 211 (e.g., a height) that is perpendicular to the axis of rotation 250 of the drive pulley 120 and perpendicular to the swivel axis 200 to permit the mounting bar 115 to move within the securing slot 118 relative to tip plate 110 as indicated by the arrows 212. In this regard, the dimension 211 of the securing slot 118 may be larger than the dimension 210 of the securing aperture 112 as relatively shown in FIGS. 3A and 3B.

Since the engagement between the mounting bar 115 and the securing aperture 112 is substantially fixed in the securing aperture 112 in the dimension 211, the elongated securing slot 118 may allow the engagement between the mounting bar 115 and the securing aperture 112 to operate as a pivot point for the tip plate 110. Therefore, as the tip plate 110 pivots about the pivot axis 201, defined by the engagement between the mounting bar 115 and the securing aperture 112, the mounting bar 115 moves within the securing slot 118 along the direction of the elongation. According to some example embodiments, the elongation of the securing slot 118 allows the tip plate 110 to pivot as described herein. It is, however, understood that other approaches for permitting the tip plate 110 to pivot within a plane of the plate portion of the tip plate may be implemented in accordance with example embodiments. Additionally, the positioning of the upper edge 212 and the lower edge 213 of the securing slot 118 may be specifically selected. In this regard, as further described below, the tip plate 110 freely pivots about the pivot axis 201. The pivoting is caused in response to a direction of an engagement force between the friction ring 130 and the engaging face 124 of the drive pulley 120. For example, when the engagement force is directed in a first direction causing the tip plate 110 to pivot downwards, the pivoting will stop when the mounting bar 115 contacts the top edge 212. As such, an angle for pivoting the tip plate 110 downwards is defined by the position of the top edge 212. Accordingly, the position of the top edge 212, according to some example embodiments, may be selected for optimal performance of the friction drive transmission 100 when rotating in the first direction. In the same manner, when the engagement force is directed in a second direction (i.e., opposite to the first direction) causing the tip plate 110 to pivot upwards, the pivoting will stop when the mounting bar 115 contacts the lower edge 213. As such, an angle for pivoting the tip plate 110 upwards is defined by the position of the lower edge 213. Accordingly, the position of the lower edge 213, according to some example embodiments, may be selected for optimal performance of the friction drive transmission 100 when rotating in the second direction. Note also that, because the tip plate 110 may freely pivot, the tip plate 110 transitions between the maximum angle for pivoting upwards and a maximum angle for pivoting downwards, such that, other than the brief time during a transition between directions, the pivoting position of the tip plate 110 is binary (i.e., either pivoted upwards to a maximum angle or pivoted downwards to a maximum angle).

Figure 4A:
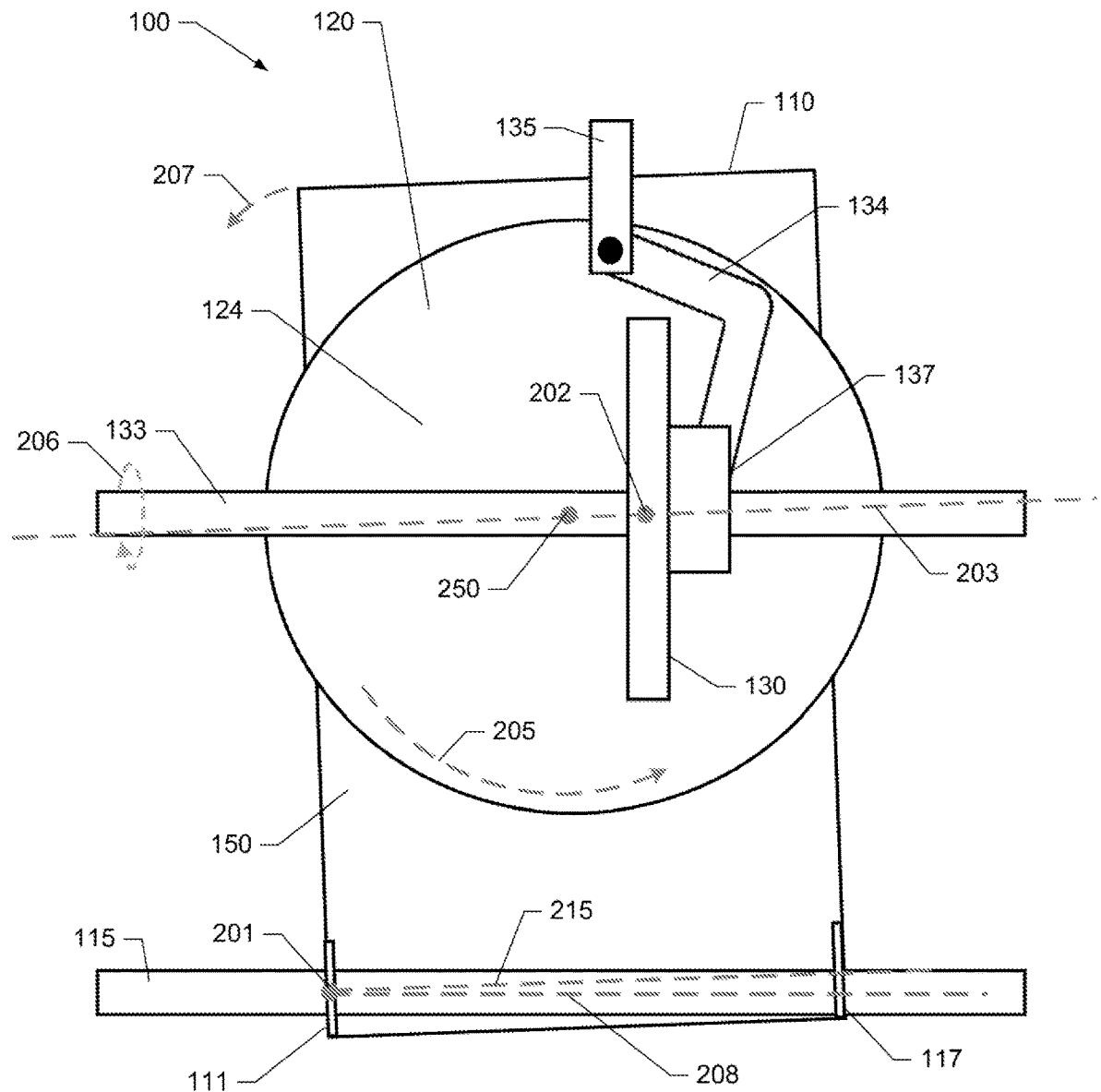
FIG. 4A illustrates a front view of the friction drive transmission of FIG. 1 with a friction ring in a reverse rotation position according to some example embodiments.
Figure 4B:
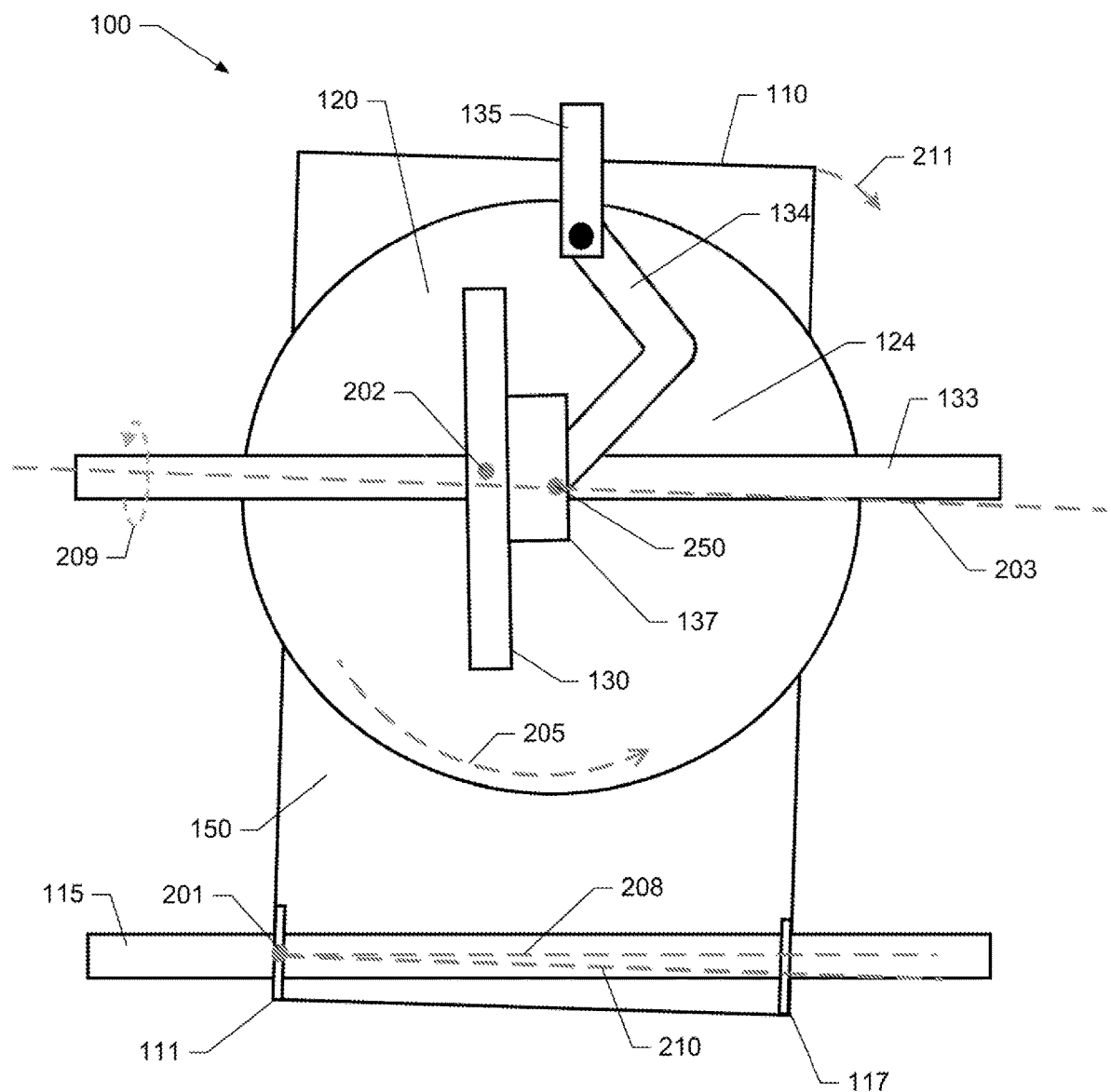
FIG. 4B illustrates a front view of the friction drive transmission of FIG. 1 with a friction ring in a forward rotation position according to some example embodiments.

Referring now to FIGS. 4A and 4B, the friction drive transmission 100 is shown with respect to pivoting movements of the tip plate 110. FIG. 4A illustrates the friction ring 130 in a reverse rotation position causing the axle 133 to rotate in reverse. FIG. 4B illustrates the friction ring 130 in a forward rotation position causing the axle to rotate forward.

Referring specifically to FIG. 4A, the drive pulley 120 is shown as being driven in a counterclockwise direction as indicated by arrow 205. The friction ring 130 is positioned (e.g., via movement of the control arms 134 and 135) in engagement with the engaging face 124 on a right side of the axis of rotation 250 of the engaging face 124. Due to this positioning of the friction ring 130 and the direction of rotation of the engaging face 124, the friction ring 130 rotates clockwise when viewed from the left side, as indicated by arrow 206, which defines the reverse direction of rotation for the friction ring 130 and the axle 133.

Because of the position of the friction ring 130 and the reverse direction of rotation 206, an engagement force between the friction ring 130 and the engaging face 124 of the drive pulley 120 urges the right side of the tip plate 110 upwards and a left side of the tip plate 110 downwards. Due to the constraints on movement caused by the securing aperture 112 and the securing slot 118, the tip plate 110 pivots about the pivots axis 201 in a counterclockwise direction as indicated by arrow 207 and is stopped due to contact between the lower edge 213 of the securing slot 118 and the mounting bar 115. This pivoting of the tip plate 110 also results in a pivoting of the engaging face centerline 203. The angle of the pivot can be defined with respect to a centerline of the mounting bar 115 and the pivoted swivel axis 215.

According to some example embodiments, when operating in the reverse rotation direction, the friction drive transmission 100 may have smooth operation when the engaging face centerline 203 is aligned with the friction ring centerline 202, as shown in FIG. 4A. As such, the lower edge 213 of the securing slot 118 may be positioned such that the engaging face centerline 203 pivots into alignment with the friction ring centerline 202, when the friction ring 130 is in a reverse rotation position. In this configuration, when the friction ring 130 is in the reverse rotation position, improved engagement between the friction ring 130 and the engaging face 124 can be realized to inhibit or prevent skipping and wobbling. Additionally, in this configuration, when the friction ring 130 is in the reverse rotation position, increased reverse speed and drive force (e.g., torque) can be realized because of the improvement in engagement between the friction ring 130 and the engaging face 124.

Referring now to FIG. 4B, the drive pulley 120 is, again, shown as being driven in a counterclockwise direction as indicated by arrow 205. The friction ring 130 is now positioned (e.g., via movement of the control arms 134 and 135) in engagement with the engaging face 124 on a left side of the axis of rotation 250 of the engaging face 124. Due to this positioning of the friction ring 130 and the direction of rotation of the engaging face 124, the friction ring 130 rotates counterclockwise when viewed from the left side, as indicated by arrow 209, which defines the forward direction of rotation for the friction ring 130 and the axle 133.

Because of the position of the friction ring 130 and the forward direction of rotation 209, an engagement force between the friction ring 130 and the engaging face 124 of the drive pulley 120 urges the right side of the tip plate 110 downwards and a left side of the tip plate 110 upwards. Due to the constraints on movement caused by the securing aperture 112 and the securing slot 118, the tip plate 110 pivots about the pivots axis 201 in a clockwise direction as indicated by arrow 211 and is stopped due to contact between the upper edge 212 of the securing slot 118 and the mounting bar 115. This pivoting of the tip plate 110 also results in a pivoting of the engaging face centerline 203. The angle of the pivot can be defined with respect to a centerline of the mounting bar 115 and the pivoted swivel axis 210. According to some example embodiments, when operating in the forward rotation direction, the friction drive transmission 100 may have smooth operation when the engaging face centerline 203 is below (e.g., slightly below, such as, for example, less then 50 millimeters below for a 10 centimeter diameter engaging face 124) the friction ring centerline 202, as shown in FIG. 4B. As such, the upper edge 212 of the securing slot 118 may be positioned such that the engaging face centerline 203 pivots into a position below the friction ring centerline 202, when the friction ring 130 is in a forward rotation position. In this configuration, when the friction ring 130 is in the forward rotation position, improved engagement between the friction ring 130 and the engaging face 124 can be realized. Such a configuration can operate to reduce or eliminate undesired self-acceleration that is caused by, for example, skipping and wobbling when the friction ring 130 is moved into different forward rotation positions (closer or farther from the axis of rotation 250) relative to the engaging face 124. Additionally, in this configuration, when the friction ring 130 is in the forward rotation position, more accurate and consistent forward drive speeds can be realized as the friction ring 130 moves between exterior and interior positions relative to the axis of rotation 250 for the engaging face 124.

Figure 5A:
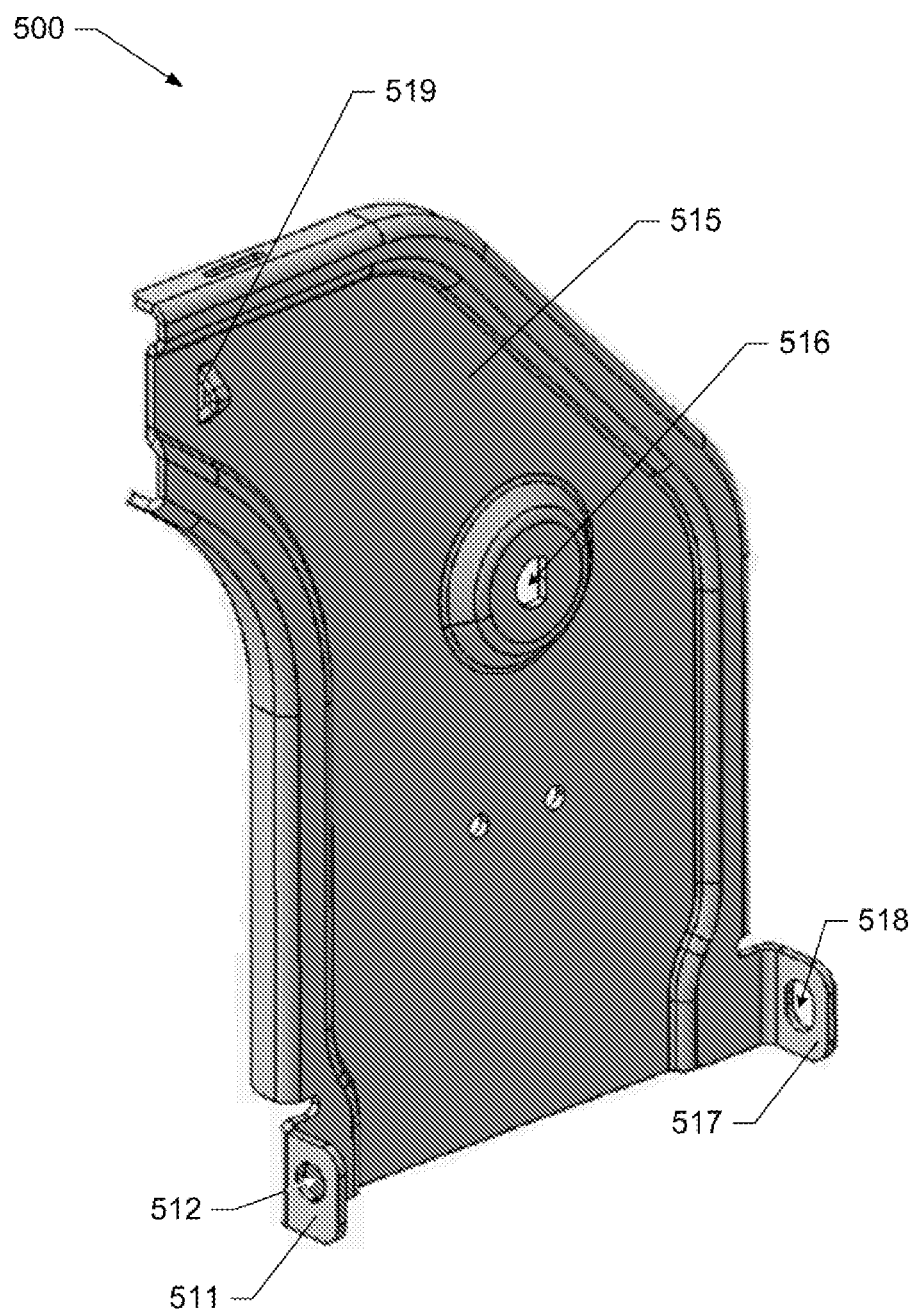
FIG. 5A illustrates a perspective view of another tip plate according to some example embodiments.

According to some example embodiments, another example tip plate 510 is shown in a perspective view in FIG. 5A. The tip plate 510 is similar to the tip plate 110. The tip plate 510 is configured to operate in a same or similar manner as the tip plate 110 described above. In this regard, the tip plate 510 comprises a pulley shaft aperture 516 that is keyed and is configured to receive a pulley shaft to secure a drive pulley to the tip plate 510. Further, the tip plate 510 includes a connector 519 that may be connected to a cable or the like to control swiveling movement of the tip plate 510 relative to a friction ring 130 as described herein.

Figure 5B:
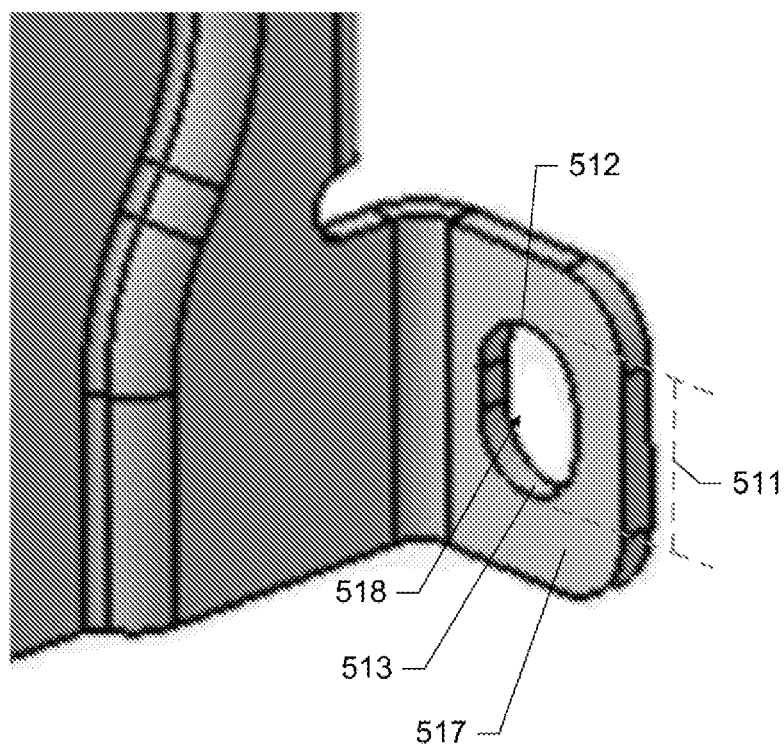
FIG. 5B illustrates a zoomed view of a tip plate tab of the tip plate of FIG. 5A according to some example embodiments.

The tip plate 510 may also comprise tabs 511 and 517 that extend away from a plate portion 515 in a perpendicular direction. The tab 511, disposed on a first side of the plate portion 515, may comprise a securing aperture 512 and the tab 517, disposed on an opposing side to the plate portion 515, may comprise a securing slot 518. Similar to the securing aperture 112 and the securing slot 118, the securing slot 518 has an elongated shape relative to the securing aperture 512. In this regard, a dimension of the securing slot 518 (e.g., a height) is larger than the same dimension in the securing aperture 512 (e.g., height). FIG. 5B illustrates a zoomed perspective view of the tab 517. As shown, the dimension 511 is elongated. Further, the upper edge 512 and the lower edge 513 may be positioned to optimize the pivoting position of the engaging face of a drive pulley when the tip plate 510 is pivoted in a first position or in a second position. The difference in this dimension between the securing aperture 512 and the securing slot 518 facilitates the tip plate 510's ability to pivot when implemented in a friction drive transmission as described herein.

Figure 6:
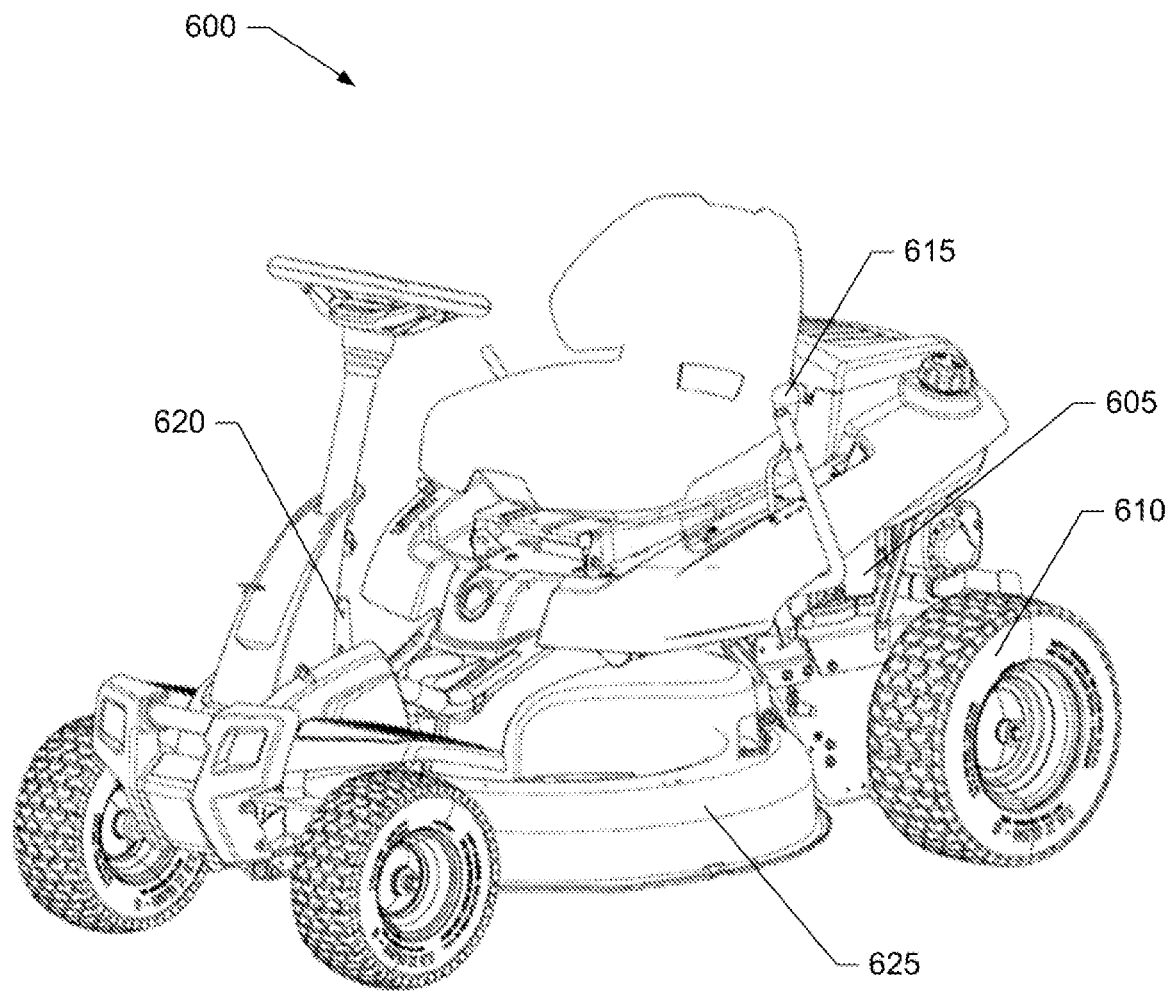
FIG. 6 illustrates an example mower configured to implement a friction drive transmission according to some example embodiments.

FIG. 6 illustrates an example riding mower 600 as an example of a tool that may implement a friction drive transmission, such as the friction drive transmission 100 described herein. The mower 600 may include an engine 605 that may be configured to rotate a drive belt connected to the drive pulley 120 of the friction drive transmission 100. The engine 605 may also be coupled to a cutting blade or other tool to perform an operation (e.g., cutting). The cutting blade may be disposed within the deck hood 625. Further, the axle 133 may be operably coupled to the wheel 610 to drive the wheel 610 when the axle 133 rotates, either in a forward or reverse direction, due to engagement of the friction ring 130 with the engaging face 124. The mower 600 may also include a gear shift 615 that may embody or be operably coupled to the actuator 136 to reposition the friction ring 130 on the engaging face 124 based on a speed or direction of movement desired by an operator. The mower 600 may also comprise a foot pedal 620 that may be operably coupled to the connecter 119 of the tip plate 110. As such, movement of the foot pedal 620 may cause the tip plate 110 to swivel into and out of engagement with the engaging face 124 to control rotation of the axle 133.

Figure 7:
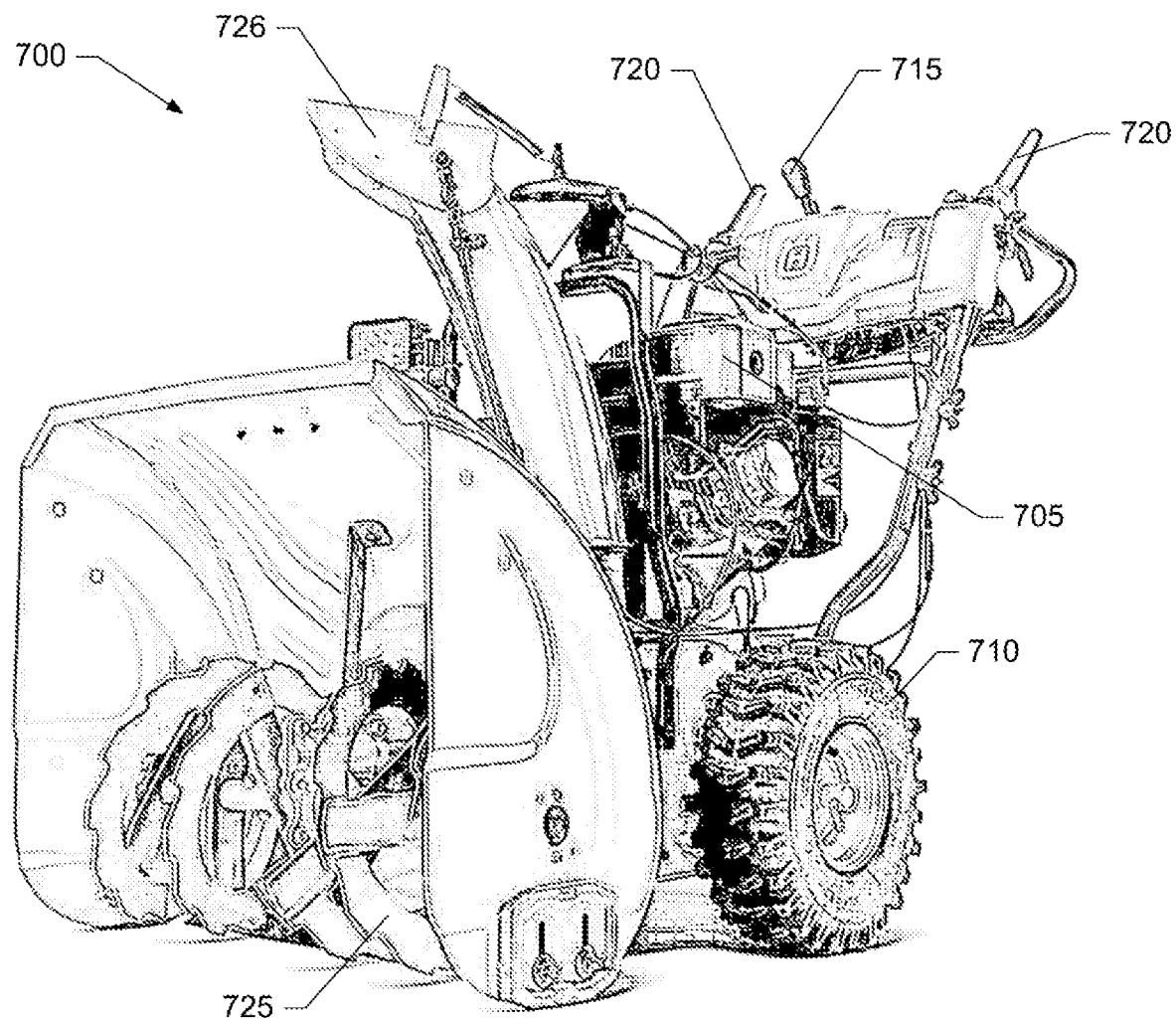
FIG. 7 illustrates an example snow thrower configured to implement a friction drive transmission according to some example embodiments.

FIG. 7 illustrates an example snow thrower 700 (e.g., propelled, walk-behind snow thrower) as another example of a tool that may implement a friction drive transmission, such as the friction drive transmission 100 described herein. The snow thrower 700 may include an engine 705 that may be configured to rotate a drive belt connected to the drive pulley 120 of the friction drive transmission 100. The engine 705 may also be coupled to a thrower blade 725 or other tool to perform an operation (e.g., snow throwing). The thrower blade 725 may be driven and rotate to propel snow out of the shoot 726. Further, the axle 133 may be operably coupled to the wheel 710 to drive the wheel 710 when the axle 133 rotates, either in a forward or reverse direction, due to engagement of the friction ring 130 with the engaging face 124. The snow thrower 700 may also include a gear shift 715 that may embody or be operably coupled to the actuator 136 to reposition the friction ring 130 on the engaging face 124 based on a speed or direction of movement desired by an operator. The snow thrower 700 may also comprise a control lever 720 that may be operably coupled to the connecter 119 of the tip plate 110. As such, movement of the control lever 720 may cause the tip plate 110 to swivel into and out of engagement with the engaging face 124 to control rotation of the axle 133.

Having described various example embodiments, some additional example embodiments will now be described in multiple combinations with various features described herein. In this regard, in a first example embodiment, a friction drive transmission is provided. The friction drive transmission may comprise a drive pulley comprising an engaging face, a tip plate that supports the drive pulley and is configured to pivot about a pivot axis that is parallel to an axis of rotation of the drive pulley, and a friction ring that drives an axle. The friction ring may contact the engaging face of the drive pulley and may be moveable relative to the engaging face of the drive pulley to transition between forward rotation and reverse rotation. When the friction ring moves into a reverse rotation position for reverse rotation of the axle, the tip plate may pivot, with the drive pulley, about the pivot axis from a first position into a second position. The first position may be different from the second position.

In a second embodiment, when the friction ring moves into a forward rotation position for forward rotation of the axle, the tip plate may pivot, with the drive pulley, about the pivot axis into the first position. The second embodiment may be combined with the first embodiment, as appropriate. In a third embodiment, the pivoting of the tip plate may move a centerline of the engaging face below a centerline of the friction ring when the friction ring is in the forward rotation position. The third embodiment may be combined with the second embodiment, as appropriate. In a fourth embodiment, the pivoting of the tip plate may align a centerline of the engaging face with a centerline of the friction ring when the friction ring is in the reverse rotation position. The fourth embodiment may be combined with any or all of the first through third embodiments, as appropriate. In a fifth embodiment, an engaging force between the engaging face and the friction ring, due to a position of the friction ring on the engaging face, may cause the tip plate to pivot. The fifth embodiment may be combined with any or all of the first through fourth embodiments, as appropriate. In a sixth embodiment, the friction drive transmission may further comprise a mounting member. The tip plate may further comprise a securing aperture and a securing slot. The mounting member may be disposed within the securing aperture and the securing slot. The securing slot may have a dimension that is larger than the securing aperture to permit the tip plate to pivot relative to the mounting member. The pivot axis may be located at an engagement point between the mounting member and the securing aperture. The sixth embodiment may be combined with any or all of the first through fifth embodiments, as appropriate. In a seventh embodiment, the securing aperture may be disposed on a first side of the tip plate and the securing slot may be disposed on a second, opposite, side of the tip plate. The seventh embodiment may be combined with the sixth embodiment, as appropriate. In an eighth embodiment, the securing aperture may be disposed on a first tab that extends away from a plate portion of the tip plate, and the securing slot may be disposed on a second tab that extends away from the plate portion of the tip plate. The eighth embodiment may be combined with the sixth or seventh embodiment, as appropriate. In a ninth embodiment, a control arm is configured to move the friction ring. The ninth embodiment may be combined with any or all of the first through eighth embodiments, as appropriate. In a tenth embodiment, the axle may be configured to drive a wheel of a lawn mower or snow thrower. The tenth embodiment may be combined with any or all of the first through ninth embodiments, as appropriate.

In an eleventh example embodiment, another friction drive transmission is provided. This friction drive transmission may comprise a drive pulley comprising an engaging face, a tip plate that supports the drive pulley and is configured to pivot about a pivot axis that is parallel to an axis of rotation of the engaging face of the drive pulley, and a friction ring that drives an axle, wherein the friction ring contacts the engaging face of the drive pulley and is moveable relative to the engaging face of the drive pulley to transition between forward rotation and reverse rotation. In response to an engaging force between the friction ring and the engaging face, the tip plate may be configured to pivot about the pivot axis to align a centerline of the engaging face with a centerline of the friction ring when the friction ring is in a reverse rotation position, and move the centerline of the engaging face below the centerline of the friction ring when the friction ring is in the forward rotation position.

In a twelfth embodiment, the engaging face and the friction ring may be configured to move relative to each other to increase or decrease an engaging force between engaging face and the friction ring. The twelfth embodiment may be combined with the eleventh embodiment, as appropriate. In a thirteenth embodiment the friction ring is configured to slide along the axle to transition between the forward rotation position and reverse rotation position. The thirteenth embodiment may be combined with the eleventh or twelfth embodiments, as appropriate. In a fourteenth embodiment, an engaging force between the engaging face and the friction ring may cause the tip plate to pivot due to a position of the friction ring on the engaging face. The fourteenth embodiment may be combined with any or all of the eleventh through fifteenth embodiments, as appropriate. In a fifteenth embodiment, the friction drive transmission may further comprise a mounting member. The tip plate may further comprise a securing aperture and a securing slot. The mounting member may be disposed within the securing aperture and the securing slot. The securing slot may have a dimension that is larger than the securing aperture to permit the tip plate to pivot relative to the mounting member. The fifteenth embodiment may be combined with any or all of the eleventh through fourteenth embodiments, as appropriate. In a sixteenth embodiment, the pivot axis may be located at an engagement point between the mounting member and the securing aperture. The sixteenth embodiment may be combined with the fifteenth embodiment, as appropriate. In a seventeenth embodiment, the securing aperture may be disposed on a first side of the tip plate and the securing slot may be disposed on a second, opposite, side of the tip plate. The seventeenth embodiment may be combined with fifteenth or sixteenth embodiments, as appropriate. In an eighteenth embodiment, the securing aperture may be disposed on a first tab that extends away from a plate portion of the tip plate, and the securing slot may be disposed on a second tab that extends away from the plate portion of the tip plate. The eighteenth embodiment may be combined with any or all of the fifteenth through seventeenth embodiments, as appropriate. In a nineteenth embodiment, a control arm may be configured to move the friction ring. The nineteenth embodiment may be combined with any or all of the first through eighteenth embodiments, as appropriate. In a twentieth embodiment, the axle may be configured to drive a wheel of a lawn mower or snow thrower. The twentieth embodiment may be combined with any or all of the eleventh through nineteenth embodiments, as appropriate.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A friction drive transmission comprising:
    a drive pulley comprising an engaging face;
    a tip plate that supports the drive pulley and is configured to pivot about a pivot axis that is parallel to an axis of rotation of the engaging face of the drive pulley; and
    a friction ring that drives an axle, wherein the friction ring contacts the engaging face of the drive pulley and is moveable relative to the engaging face of the drive pulley to transition between forward rotation and reverse rotation;
    wherein, when the friction ring moves into a reverse rotation position for reverse rotation of the axle, the tip plate pivots, with the drive pulley, about the pivot axis from a first position into a second position, the first position being different from the second position;
    wherein an engaging force between the engaging face and the friction ring, due to a position of the friction ring on the engaging face, causes the tip plate to pivot.

2. The friction drive transmission of claim 1, wherein, when the friction ring moves into a forward rotation position for forward rotation of the axle, the tip plate pivots, with the drive pulley, about the pivot axis into the first position.

3. The friction drive transmission of claim 2, wherein the pivoting of the tip plate moves a centerline of the engaging face below a centerline of the friction ring when the friction ring is in the forward rotation position.

4. The friction drive transmission of claim 1, wherein the pivoting of the tip plate aligns a centerline of the engaging face with a centerline of the friction ring when the friction ring is in the reverse rotation position.

5. The friction drive transmission of claim 1, wherein a control arm is configured to move the friction ring.

6. The friction drive transmission of claim 1, wherein the axle is configured to drive a wheel of a lawn mower or snow thrower.

7. A friction drive transmission comprising:
a drive pulley comprising an engaging face;
a tip plate that supports the drive pulley and is configured to pivot about a pivot axis that is parallel to an axis of rotation of the engaging face of the drive pulley; and
a friction ring that drives an axle, wherein the friction ring contacts the engaging face of the drive pulley and is moveable relative to the engaging face of the drive pulley to transition between forward rotation and reverse rotation;
wherein, when the friction ring moves into a reverse rotation position for reverse rotation of the axle, the tip plate pivots, with the drive pulley, about the pivot axis from a first position into a second position, the first position being different from the second position;
wherein the friction drive transmission further comprises a mounting member;
wherein the tip plate further comprises a securing aperture and a securing slot;
wherein the mounting member is disposed within the securing aperture and the securing slot;
wherein the securing slot has a dimension that is larger than the securing aperture to permit the tip plate to pivot relative to the mounting member; and
wherein the pivot axis is located at an engagement point between the mounting member and the securing aperture.

8. The friction drive transmission of claim 7, wherein the securing aperture is disposed on a first side of the tip plate and the securing slot is disposed on a second, opposite, side of the tip plate.

9. The friction drive transmission of claim 7, wherein the securing aperture is disposed on a first tab that extends away from a plate portion of the tip plate; and
wherein the securing slot is disposed on a second tab that extends away from the plate portion of the tip plate.

10. A friction drive transmission comprising:
a drive pulley comprising an engaging face;
a tip plate that supports the drive pulley and is configured to pivot about a pivot axis that is parallel to an axis of rotation of the engaging face of the drive pulley; and
a friction ring that drives an axle, wherein the friction ring contacts the engaging face of the drive pulley and is moveable relative to the engaging face of the drive pulley to transition between forward rotation and reverse rotation;
wherein, in response to an engaging force between the friction ring and the engaging face, the tip plate is configured to pivot about the pivot axis to:
align a centerline of the engaging face with a centerline of the friction ring when the friction ring is in a reverse rotation position, and
move the centerline of the engaging face below the centerline of the friction ring when the friction ring is in the forward rotation position.

11. The friction drive transmission of claim 10, wherein the engaging face and the friction ring are configured to move relative to each other to increase or decrease an engaging force between engaging face and the friction ring.

12. The friction drive transmission of claim 10, wherein the friction ring is configured to slide along the axle to transition between the forward rotation position and reverse rotation position.

13. The friction drive transmission of claim 10, wherein an engaging force between the engaging face and the friction ring causes the tip plate to pivot due to a position of the friction ring on the engaging face.

14. The friction drive transmission of claim 10, further comprising a mounting member;
wherein the tip plate further comprises a securing aperture and a securing slot;
wherein the mounting member is disposed within the securing aperture and the securing slot;
wherein the securing slot has a dimension that is larger than the securing aperture to permit the tip plate to pivot relative to the mounting member.

15. The friction drive transmission of claim 14, wherein the pivot axis is located at an engagement point between the mounting member and the securing aperture.

16. The friction drive transmission of claim 14, wherein the securing aperture is disposed on a first side of the tip plate and the securing slot is disposed on a second, opposite, side of the tip plate.

17. The friction drive transmission of claim 14, wherein the securing aperture is disposed on a first tab that extends away from a plate portion of the tip plate; and
wherein the securing slot is disposed on a second tab that extends away from the plate portion of the tip plate.

18. The friction drive transmission of claim 10, wherein a control arm is configured to move the friction ring.

19. The friction drive transmission of claim 10, wherein the axle is configured to drive a wheel of a lawn mower or snow thrower.

* * * * *